US012509420B2

(12) United States Patent
Kwon et al.

(10) Patent No.: US 12,509,420 B2
(45) Date of Patent: Dec. 30, 2025

(54) COMPOUND AS A UBR BOX DOMAIN LIGAND

(71) Applicant: AUTOTAC INC., Seoul (KR)

(72) Inventors: Yong Tae Kwon, Seoul (KR); Hyun Tae Kim, Seoul (KR); Jeong Eun Na, Gyeonggi-do (KR); Yu Jin Seo, Gyeonggi-do (KR); Chang Hoon Ji, Seoul (KR); Ha Rim Choi, Seoul (KR); Ji Eun Lee, Seoul (KR); Ah Jung Heo, Gyeonggi-do (KR)

(73) Assignee: AUTOTAC INC., Seoul (KR)

( * ) Notice: Subject to any disclaimer, the term of this patent is extended or adjusted under 35 U.S.C. 154(b) by 581 days.

(21) Appl. No.: 17/921,688

(22) PCT Filed: Apr. 27, 2021

(86) PCT No.: PCT/KR2021/005335
§ 371 (c)(1),
(2) Date: Oct. 27, 2022

(87) PCT Pub. No.: WO2021/221444
PCT Pub. Date: Nov. 4, 2021

(65) Prior Publication Data
US 2023/0174465 A1 Jun. 8, 2023

Related U.S. Application Data

(60) Provisional application No. 63/015,945, filed on Apr. 27, 2020.

(51) Int. Cl.
| | | |
|---|---|---|
| C07C 311/49 | (2006.01) |
| C07C 235/16 | (2006.01) |
| C07C 237/42 | (2006.01) |
| C07C 243/36 | (2006.01) |
| C07C 243/38 | (2006.01) |
| C07C 311/39 | (2006.01) |
| C07C 317/28 | (2006.01) |
| C07C 317/36 | (2006.01) |
| C07D 207/12 | (2006.01) |
| C07D 209/08 | (2006.01) |
| C07D 209/30 | (2006.01) |
| C07D 209/34 | (2006.01) |
| C07D 209/42 | (2006.01) |
| C07D 209/44 | (2006.01) |
| C07D 211/54 | (2006.01) |
| C07D 231/18 | (2006.01) |
| C07D 231/56 | (2006.01) |
| C07D 277/36 | (2006.01) |
| C07D 295/135 | (2006.01) |
| C07D 307/68 | (2006.01) |
| C07D 471/04 | (2006.01) |

(52) U.S. Cl.
CPC .......... *C07C 311/49* (2013.01); *C07C 235/16* (2013.01); *C07C 237/42* (2013.01); *C07C 243/36* (2013.01); *C07C 243/38* (2013.01); *C07C 311/39* (2013.01); *C07C 317/28* (2013.01); *C07C 317/36* (2013.01); *C07D 207/12* (2013.01); *C07D 209/08* (2013.01); *C07D 209/30* (2013.01); *C07D 209/34* (2013.01); *C07D 209/42* (2013.01); *C07D 209/44* (2013.01); *C07D 211/54* (2013.01); *C07D 231/18* (2013.01); *C07D 231/56* (2013.01); *C07D 277/36* (2013.01); *C07D 295/135* (2013.01); *C07D 307/68* (2013.01); *C07D 471/04* (2013.01); *C07C 2602/08* (2017.05)

(58) Field of Classification Search
CPC ..................................................... C07C 311/49
See application file for complete search history.

(56) References Cited

U.S. PATENT DOCUMENTS

| | | |
|---|---|---|
| 5,464,738 A | 11/1995 | Lynch et al. |
| 6,809,119 B2 | 10/2004 | Hu et al. |
| 2003/0149110 A1 | 8/2003 | Hu et al. |
| 2016/0185785 A1 | 6/2016 | Ioannidis et al. |
| 2018/0222857 A1 | 8/2018 | Voss et al. |

FOREIGN PATENT DOCUMENTS

| | | |
|---|---|---|
| AU | 2015374170 | 7/2017 |
| AU | 2016277367 A1 | 12/2017 |
| CN | 1339485 A | 3/2002 |
| CN | 104797591 A | 7/2015 |
| CN | 105189484 A | 12/2015 |
| CN | 107406451 A | 11/2017 |
| CN | 109748873 A | 5/2019 |
| CN | 110431135 A | 11/2019 |
| CN | 110914271 A | 3/2020 |

(Continued)

OTHER PUBLICATIONS

Written Opinion from PCT/KR2021/005336 dated Aug. 17, 2021.

(Continued)

*Primary Examiner* — Shawquia Jackson
(74) *Attorney, Agent, or Firm* — Harness, Dickey & Pierce, P.L.C.

(57) ABSTRACT

The present specification relates to a compound as a UBR box domain ligand. The present specification provides a small molecule compound that binds to the UBR box domain. Further, the present specification provides a composition for inhibiting UBR box domain substrate binding, including a ligand compound that binds to a UBR box domain, a pharmaceutical composition for treating UBR-related disease, and a use thereof.

9 Claims, 5 Drawing Sheets

(56) References Cited

FOREIGN PATENT DOCUMENTS

| | | |
|---|---|---|
| JP | 2003-206273 A | 7/2003 |
| JP | 2015-526433 A | 9/2015 |
| KR | 10-2015-0080706 A | 7/2015 |
| KR | 10-2018-0038293 A | 4/2018 |
| TW | 201639847 A | 11/2016 |
| WO | WO-01-83481 A1 | 11/2001 |
| WO | WO-2007/056464 A1 | 5/2007 |
| WO | WO-2015102419 A1 | 7/2015 |
| WO | WO-2018/102419 A1 | 6/2018 |
| WO | WO-2019/084030 A1 | 5/2019 |
| WO | WO-2019108824 A1 | 6/2019 |

OTHER PUBLICATIONS

Office Action of Chinese Patent Application No. 202180045420.X dated Sep. 29, 2023.
STN Registry / Aug. 15, 2005 / CAS 860238-09-1.
Daniel L. Priebbenow et al., "Discovery of Acylsulfonohydrazide-Derived Inhibitors of the Lysine Acetyltransferase, KAT6A, as Potent Senescence-Inducing Anti-Cancer Agents" *Journal of Medicinal Chemistry*, 63, Mar. 2, 2020.
Swamy Jagadish et al., "Platelet protective efficacy of 3,4,5 trisubstituted isoxazole analogue by inhibiting ROS-mediated apoptosis and platelet aggregation" *Mol. Cell. Biochem*, 414, Dec. 31, 2016.
Office Action of CN Patent Application No. 202180044509.4 dated Nov. 27, 2023.
European Search Report of EP Patent Application No. 21796989.8 issued on Apr. 24, 2024.
Osman et al, XP 971918 A "Synthesis of Sulfanilamido-Naphtoquinones as Potential Antituberculous Agents", Journal of Pharmaceutical Sciences, 1983, 72(1), pp. 68-71.
Japanese Office Action of JP Patent Application No. 2022-563435 issued on May 28, 2024.
The Second Office Action of CN Patent Application No. 202180045420.X issued on Jul. 12, 2024.
Osman, S. A. A., et al., "Synthesis of Sulfanilamido-Naphtoquinones as Potential Antituberculous Agents", Journal of Pharmaceutical Sciences, 1983, 72(1), pp. 68-71.
Guha, P. C., et al., Current Science, Letters to the Editor, 1943, 12, 150.
Ariesan, V., et al.,; Farmacia (Bucharest, Romania), 1971, 19(4), pp. 213-218.
Office Action from corresponding Taiwanese Patent Application No. 110115113 issued on Nov. 20, 2024.
Written Opinion of the International Searching Authority from corresponding PCT Application No. PCT/KR2021/005335, dated Aug. 23, 2021.
Office Action from corresponding Korean Patent Application No. 10-2022-7037602, issued on Aug. 30, 2024.
Ni, C., et al.; "Access to Thiophene and 1H-Pyrrole via Amine-Initiated (3+2) Annulation and Aromatization Cascade Reaction of β'-Acetoxy Allenoate and 1,2-Bisnucleophile", Org. Lett., 2016, vol. 18, pp. 2240-2243.
International Search Report from corresponding PCT Application No. PCT/KR2021/005335, dated Aug. 23, 2021.
International Search Report from corresponding PCT Application No. PCT/KR2021/005336, dated Aug. 17, 2021.
Chemical Abstract Compound, STNext, RN 1797947-97-7 (Jul. 9, 2015).
Chemical Abstract Compound, STNext, RN No. 34088-30-7 (Nov. 16, 1984).
Chemical Abstract Compound, STNext, RN No. 84907-37-9 (Nov. 16, 1984).
Chemical Abstract Compound, STNext, RN No. 316143-03-0 (Jan. 23, 2001).
Office Action of U.S. Appl. No. 17/921,687 issued on Jun. 16, 2025.
Leaver, et. al. J. Med. Chem. 2019, 62, 7146-7159.
Goldfarb. U.S. Pat. No. 20090163545 A1 (abstract); Jun. 25, 2009; Accession No. 2009:846108.
Chaudhary, et. al. Current Computer-Aided Drug Design (2016), 12(4), 282-293(abstract); retrieved from STN; Accession No. 2016: 1872926.
Aurelio, et al. BR 200600674 A (abstract); Oct. 30, 2007; Accession No. 2008:1149937).
Lima, et al. Journal of the Brazilian Chemical Society (1999), 10 (5), 421-428 (abstract); Accession No. 1999:789199.
Asis, et al. Acta Farmaceutica Bonaerense (1997), 16 (4), 209-214 (abstract); Accession No. 1998:144326.

COMPOUND AS A UBR BOX DOMAIN LIGAND

CROSS-REFERENCE TO RELATED APPLICATION

This application is a national phase entry of PCT Application No. PCT/KR2021/005335, filed on Apr. 27, 2021, which claims the benefit and priority of U.S. Provisional Application Ser. No. 63/015,945 filed on Apr. 27, 2020, the disclosures of which are incorporated herein by reference in its entirety.

FIELD

The content disclosed in the present specification relates to a compound as a UBR box domain ligand. The UBR box domain is a domain commonly present in a ubiquitin protein ligase E3 component n-recognin (UBR) protein of the N-end rule pathway. In this case, the UBR box domain is known as a domain to which a substrate binds. The UBR box domain is essential for binding to the N-terminal residue of a substrate to form a multiubiquitin chain in the substrate, and the substrate is known to be degraded through this process.

The present specification relates to a compound that serves as a ligand that binds to the UBR box domain.

BACKGROUND

Cells regulate the amount and function of in vivo proteins by degrading proteins. In this case, in vivo proteins may be degraded depending on the N-terminal residue sequence, and such a degradation pathway is known as an N-end rule pathway. That is, the N-end rule pathway is a proteolytic system that uses a specific protein N-end as a degradation signal. The N-end rule pathway may include the following proteolytic process.

In the case of eukaryotes, an N-recognin recognizes the N-terminal degradation signal of a protein, and the N-recognin may degrade the protein by allowing ubiquitin to bind to a protein to be degraded. In this case, the N-terminal degradation signal may include those having a residue having a positive charge (type 1: for example, arginine, lysine, and histidine) or a large hydrophobic residue (type 2: phenylalanine, leucine, tryptophan, isoleucine, and tyrosine) at the N-terminal. The present inventors discovered or cloned N-recognins UBR 1, UBR2, UBR3, and UBR5 for the first time, and revealed that the N-recognins have a UBR box domain as a substrate recognition domain (Tasaki et al. 2005). In this case, a ubiquitinated substrate produced by the binding of an N-recognin to an N-end rule ligand is delivered to a proteasome and is degraded into short peptides. In this process, a specific N-terminal residue (Nt-Arg, Nt-His, Nt-Lys, Nt-Trp, Nt-Phe, Nt-Tyr, Nt-Leu, Nt-Leu) provides most of the hydrogen bonds required when an N-recognin targets an N-end rule substrate, and thus is a determinant essential for binding (Sriram and Kwon, 2010).

The UBR is an abbreviation for Ubiquitin protein ligase E3 component n-recognin, and UBR is an N-recognin that recognizes the N-terminal degradation signal of a protein. It is known that at least 7 types of UBRs 1 to 7 are present in mammals. Further, a UBR box domain that UBRs have in common is a zinc finger motif having a size of about 70 residues, and is known as a highly conserved substrate-binding domain. [Kwon et al., 1998; Xie and Varshaysky, 1999; Kwak et al., 2004; Varshaysky, 1996; Varshaysky, 1997; Kwon et al., 2011; and Zenker et al., 2014].

That is, UBR is an N-recognin associated with the N-end rule pathway, which is a proteolytic pathway, and the UBR box domain in UBR is a substrate binding domain. In particular, among the UBRs 1 to 7, UBR1, UBR2, UBR3 and UBR5 are known to act as ubiquitin protein ligase E3 and have a RING domain or a HECT domain. An N-end rule substrate that binds to the UBR is degraded by a ubiquitin proteasome pathway. Specifically, the UBR box domain in the UBR recognizes the N-terminal amino acid of a substrate and ubiquitinates the substrate via the RING domain or the HECT domain, thereby degrading the substrate via the proteasome pathway. For example, when misfolded proteins remain in a cell for an extended period of time, the proteins may be aggregated to block proteasomes or reduce other cell functions, and thus are degraded via the ubiquitin proteasome pathway (Ji and Kwon, 2017).

That is, the UBR box domain plays an important role in an intracellular proteolytic pathway by recognizing an N-terminal degradation signal. Therefore, ligands that bind to the UBR box domain may affect intracellular proteolytic pathways.

As described above, the present specification relates to a compound as a ligand that binds to a UBR box domain associated with an intracellular proteolytic pathway.

DETAILED DESCRIPTION

Technical Problem

The present specification provides a small molecule compound that binds to a UBR box domain. In this case, the UBR box domain includes a UBR box domain in UBR 1 to 7. The small molecule compound may function as a ligand suitable for binding to UBR box domain.

In one embodiment, the present specification provides a composition for inhibition of UBR box domain substrate binding comprising a ligand compound that binds to a UBR box domain.

In one specific embodiment, the present specification provides a pharmaceutical composition for treating UBR-related disease, and a use thereof, and the composition comprises a ligand compound that binds to a UBR box domain.

In a more specific embodiment, the present specification provides a pharmaceutical composition for treating disease including a muscle loss caused by muscular dystrophy (Becker, Congennital, Duchenne, Distal, Emery-Dreifuss, Facioscapulohumeral, Limb-girdle, myotonic, ocuophargyngeal), muscle wasting diseases mediated by muscle loss or degradation including sarcopenia or cancer cachexia, diseases caused by excessive protein degradation including liposarcoma, cystic fibrosis, Johanson-Blizzard syndrome, obstructive urinary tract disease (urethral obstruction sequence), autoimmune pancreatitis or known diseases related to UBR box and UBR protein including Usher syndrome, and a use thereof, and the composition comprises a ligand compound that binds to a UBR box domain.

Technical Solution

The present specification provides a compound having the structure of formula 1 or a salt thereof.

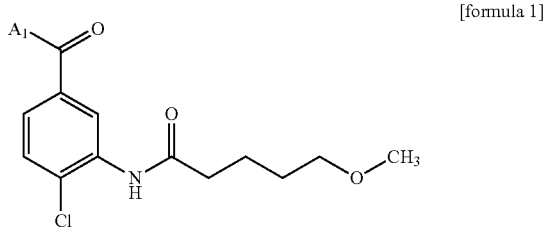

[formula 1]

wherein the $A_1$ is $CH_3$ or $NH_2$.

In this case, as an example, the present specification provides a composition for inhibition of UBR box domain substrate binding comprising the compound or a salt thereof wherein the $A_1$ is $CH_3$ or $NH_2$.

In this case, as an example, the present specification provides a pharmaceutical composition for treating UBR related disease comprising the compound or pharmaceutical acceptable salt thereof wherein the $A_1$ is $CH_3$ or $NH_2$, and a method for treating UBR related disease by using the compound.

In this case, as an example, the UBR related disease may be selected from muscle loss caused by muscular dystrophy (Becker, Congennital, Duchenne, Distal, Emery-Dreifuss, Facioscapulohumeral, Limb-girdle, myotonic, ocuophargyngeal), muscle wasting diseases mediated by muscle loss or degradation including sarcopenia or cancer cachexia, diseases caused by excessive protein degradation including liposarcoma, cystic fibrosis, Johanson-Blizzard syndrome, obstructive urinary tract disease (urethral obstruction sequence), autoimmune pancreatitis or Usher syndrome.

Advantageous Effects

An invention disclosed herein provides a ligand compound having a high binding strength with respect to a UBR box domain.

Through a UBR box domain ligand compound, UBR box domain substrate binding can be suppressed, and a variety of applications that take advantage of this characteristic can be provided. For example, a UBR-related disease (for example, sarcopena, and the like) can be treated by a UBR box domain ligand compound.

DETAILED DESCRIPTION

Figure 1:
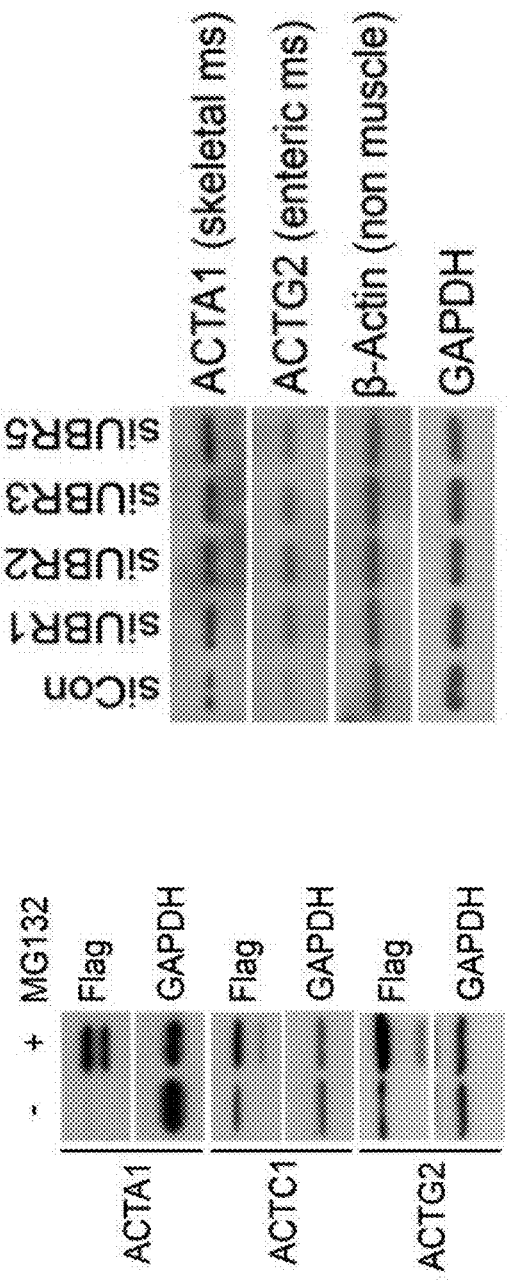
FIG. 1 illustrates the experimental results of confirming whether muscle actin is an Arg/N-degron pathway substrate using an immunoblotting method.

Hereinafter, the content of the invention will be described in more detail through specific exemplary embodiments and examples with reference to the accompanying drawings. It should be noted that the accompanying drawings include some exemplary embodiments of the invention, but not all exemplary embodiments. The content of the invention disclosed by the present specification can be implemented variously, and is not limited to specific exemplary embodiments described herein. A person with ordinary skill in the art to which the invention disclosed herein pertains will be able to conceive of many modifications and other exemplary embodiments of the content of the invention disclosed herein. Therefore, it should be understood that the content of the invention disclosed herein is not limited to the specific exemplary embodiments described herein, and modifications thereof and other exemplary embodiments are also within the scope of the claims.

Definition of Terms

The definitions of the main terms used herein are given below.

Ubiquitin Protein Ligase E3 Component n-Recognin (UBR)

The term UBR as used herein refers to an abbreviation for Ubiquitin protein ligase E3 component n-recognin. The UBR is an N-recognin that recognizes an N-terminal residue of a protein, and it is known that at least 7 types of UBRs 1 to 7 are present in mammals. The UBR is an N-recognin and is associated with the N-end rule pathway, which is an in vivo proteolytic pathway. Specifically, the UBR recognizes an N-terminal degradation signal (N-degron) of a protein, and is involved in a process by which a substrate protein is degraded via a ubiquitin proteasome pathway.

UBR Box Domain

The term UBR box domain used herein is a domain that is present in the UBR protein, and is a zinc finger motif. The UBR protein includes UBR 1 to 7 proteins. The UBR box domain is known as a domain to which a substrate protein binds. The compound as the UBR box domain ligand disclosed herein may suppress UBR box domain substrate binding by binding to the UBR box domain. Furthermore, the compound as the UBR box domain ligand disclosed herein may affect the intracellular proteolytic pathway.

RING Domain

The term RING domain used herein is known to be present in UBR 1, 2 and 3 proteins. The RING domain may also be interchanged with RING ubiquitination domain. The RING domain is a domain present in a protein and is a zinc finger motif. The RING domain is a domain that plays an important role in a process in which a ubiquitin present in E2 is transferred to a substrate protein, and the RING domain serves to allow a process in which the ubiquitin is transferred to a substrate protein to occur in one step.

HECT Domain

The term HECT domain used herein is known to be present in a UBR 5 protein. The HECT domain may also be interchanged with HECT ubiquitination domain. The HECT domain is a domain that plays an important role in a process in which the ubiquitin present in E2 is transferred to a substrate protein. The ubiquitin present in E2 is delivered to the HECT domain and then transferred to the substrate protein. That is, the HECT domain serves to allow a process in which the ubiquitin is transferred to a substrate protein to occur in two steps.

Zinc Finger Motif

As used herein, the term zinc finger motif refers to a protein structural motif in which one or more zinc ions are present to stabilize the structure of a protein. The UBR box domain and RING domain of the present specification are zinc finger motifs.

Ligand

As used herein, the term ligand refers to a material that specifically binds to a protein. The protein includes an enzyme or a receptor, and when the protein is an enzyme, the ligand may refer to a substrate or the like that binds to the enzyme, and when the protein is a receptor, the ligand may refer to a hormone or the like that binds to the receptor.

The compound as the UBR box domain ligand provided herein means a compound that binds to the UBR box domain. As an example, the compound refers to a compound that binds to the UBR box domain in the UBR protein. As a specific example, the compound refers to a compound that binds to the UBR box domain present in one or more proteins of UBRs 1 to 7. However, the compound is not limited thereto.

The compound as a UBR box domain ligand provided herein may act competitively with a substrate of the UBR box domain. That is, the compound may suppress the substrate binding of the UBR box domain. In addition, the compound may inhibit the degradation of the substrate by suppressing the binding of the substrate.

Unless otherwise defined, all technical and scientific terms used herein have the same meaning as commonly understood by one with ordinary skill in the art to which the present invention pertains. All publications, patents, and other references mentioned herein are incorporated by reference in their entity.

Hereinafter, the specific contents of the invention will be disclosed.

I. UBR BOX DOMAIN

1. Overview

The compound as the UBR box domain ligand provided herein binds to a UBR box domain. The UBR box domain is known as a domain to which an N-terminal residue sequence or an N-terminal degradation signal binds. The domain is associated with a process by which proteins are degraded by the N-end rule pathway. Therefore, the compound may affect a proteolytic process via the N-end rule pathway.

2. N-End Rule Pathway

Cells regulate the amount of protein through proteolysis. In this case, it is known that the process of protein degradation is performed by a process of recognizing a degron, which is a degradation signal of a protein. Specifically, proteolysis is regulated depending on the N-terminal residue sequence of a protein, and the proteolysis signals present at the N-terminal are collectively called N-degrons. The N-degrons includes those having a residue having a positive charge (for example, arginine, lysine, and histidine) or a large hydrophobic residue (phenylalanine, leucine, tryptophan, isoleucine, and tyrosine) at the N-terminal. As described above, the term N-end rule has been used based on the association that the half-life of a protein is determined by the amino acid residue present at the N-terminal of the protein.

3. UBR Box Domain

In the N-end rule pathway, the N-degron is recognized by an N-recognin and ubiquitin protein ligase E3 component n-recognin (UBR) was discovered as the N-recognin. The UBR is known to recognize the N-terminal residue sequence or the N-terminal degradation signal by the UBR box domain. That is, UBR recognizes a protein degradation signal through the UBR box domain, and the degradation process of the protein is performed through the recognition of the protein degradation signal.

The protein degradation process by UBR may include the following contents. The UBR box domain recognizes a substrate having an N-terminal degradation signal, a ubiquitin is bound to the substrate, and the ubiquitin-bound substrate may be degraded by proteasomes. That is, a substrate having an N-terminal degradation signal may be degraded by a ubiquitin proteasome system (UPS).

II. UBR BOX DOMAIN LIGAND

1. Overview

1) The Compound of the Present Specification Reflects the Structure of the UBR Box Domain and Characteristics of Binding to N-Terminal Pathway Substrate The compound as the UBR box domain ligand disclosed herein was designed in consideration of a structure of the UBR box domain and a binding form of the UBR box domain and the N-terminal pathway substrate.

Various amino acids present in the UBR box domain interact with and bind to amino acids in the N-terminal pathway substrate through ionic interactions, hydrogen bonding, hydrophobic interactions, and the like. By analyzing these binding modes, a small molecule compound capable of forming a suitable binding mode with the UBR box domain is synthesized and provided herein. Furthermore, compounds according to formula 1 are provided below.

2) The Compound of the Present Specification has a Structure that Enhances Binding to the UBR Box Domain.

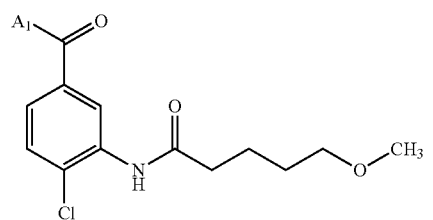

[formula 1]

In the above formula 1, $A_1$ is $CH_3$ or $NH_2$.

In this case, the compound of formula 1 disclosed herein may be present in the form of a stereoisomer or a salt thereof, and the form of the isomer or salt of such a compound is included in the scope of the present specification.

2) Specific Examples of the Compound i) Compound

As an example, the compound as the UBR box domain ligand disclosed herein may be selected from those described below:

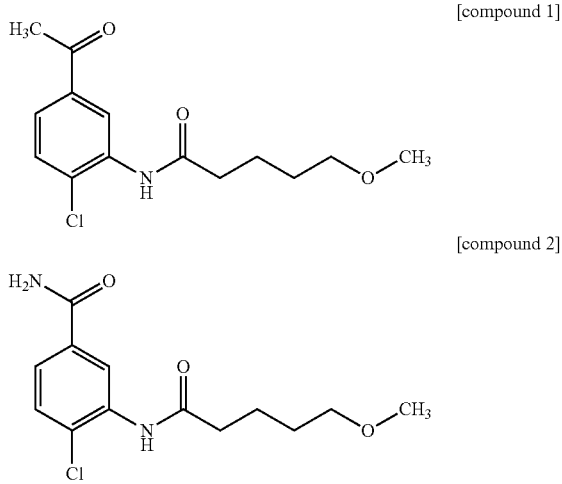

[compound 1]

[compound 2]

In this case, as the compound, a form of a possible isomer thereof or a form of a mixture thereof may be considered. For example, all stereoisomers including enantiomers and diastereomers, or mixtures thereof (for example, racemic mixtures) may be considered.

ii) Salt of Compound

As the compound disclosed herein, a form of a salt thereof may be considered. In this case, the salt contains a pharmaceutically acceptable salt. The salt disclosed herein includes an acid addition salt or a basic addition salt. An exemplary acid forming the salt includes hydrochloric acid, sulfuric acid, phosphoric acid, glycolic acid, lactic acid, pyruvic acid, citric acid, succinic acid, glutaric acid and the like, and an exemplary base forming the salt includes lithium, sodium, potassium, calcium, magnesium, methylamine, trimethylamine and the like. However, the acid and the base are not limited thereto and may be easily selected by a person skilled in the art.

III. USE OF COMPOUND

1. Inhibition of UBR Box Domain Substrate Binding

Composition for Inhibition of UBR Box Domain Substrate Binding

The compound disclosed herein may be used in the preparation of a composition for inhibition of UBR box domain substrate binding. As an example, the composition including the compound disclosed herein may be used to inhibit the UBR box domain substrate binding by binding to the UBR box domain. As another example, the composition including the compound may be used for a use of preventing the substrate which is bound to the UBR box domain and degraded from being degraded. As a specific example, the composition including the compound may be used for a use of preventing the substrate which is bound to the UBR box domain from being degraded by the ubiquitin-proteasome pathway.

As a specific example, the composition including the compound disclosed herein may be used for a use of inhibiting the binding of a substrate having an N-terminal residue that binds to a UBR box domain. As a specific example, the composition including the compound disclosed herein may be used for a use of inhibiting the binding of a substrate having an N-terminal residue such as arginine (Arg), lysine (Lys), histidine (His), tryptophan (Trp), phenylalanine (Phe), tyrosine (Tyr), leucine (Leu), and isoleucine (Ile). However, the use is not limited thereto, the composition may be used for a use of inhibiting the binding of a material known as a substrate of the UBR box domain in the art.

Figure 2:
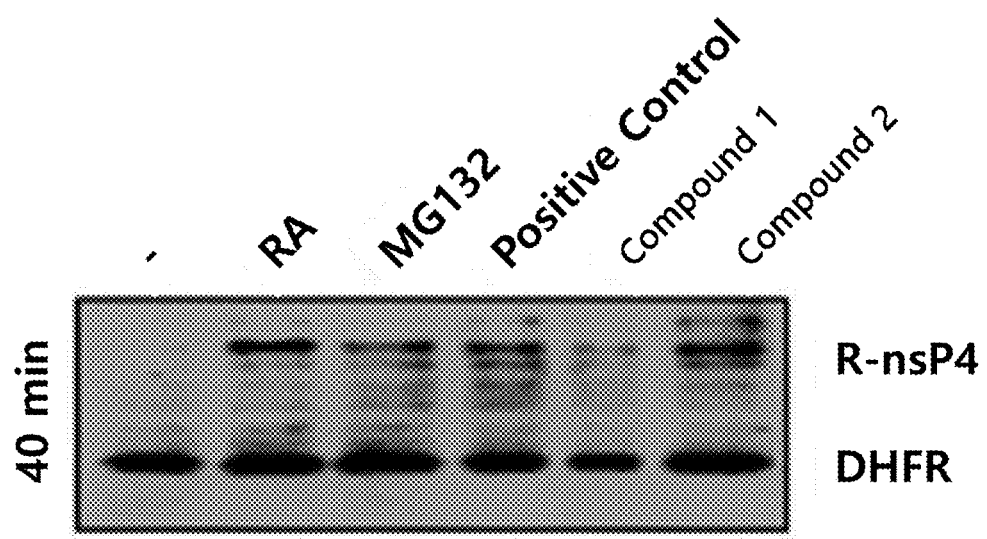
FIG. 2 illustrates the experimental results of confirming whether the expression of R-nsp4 according to binding to UBR1 of a compound (Compounds 1, 2) using an in vitro transcription/translation method.
Figure 3:
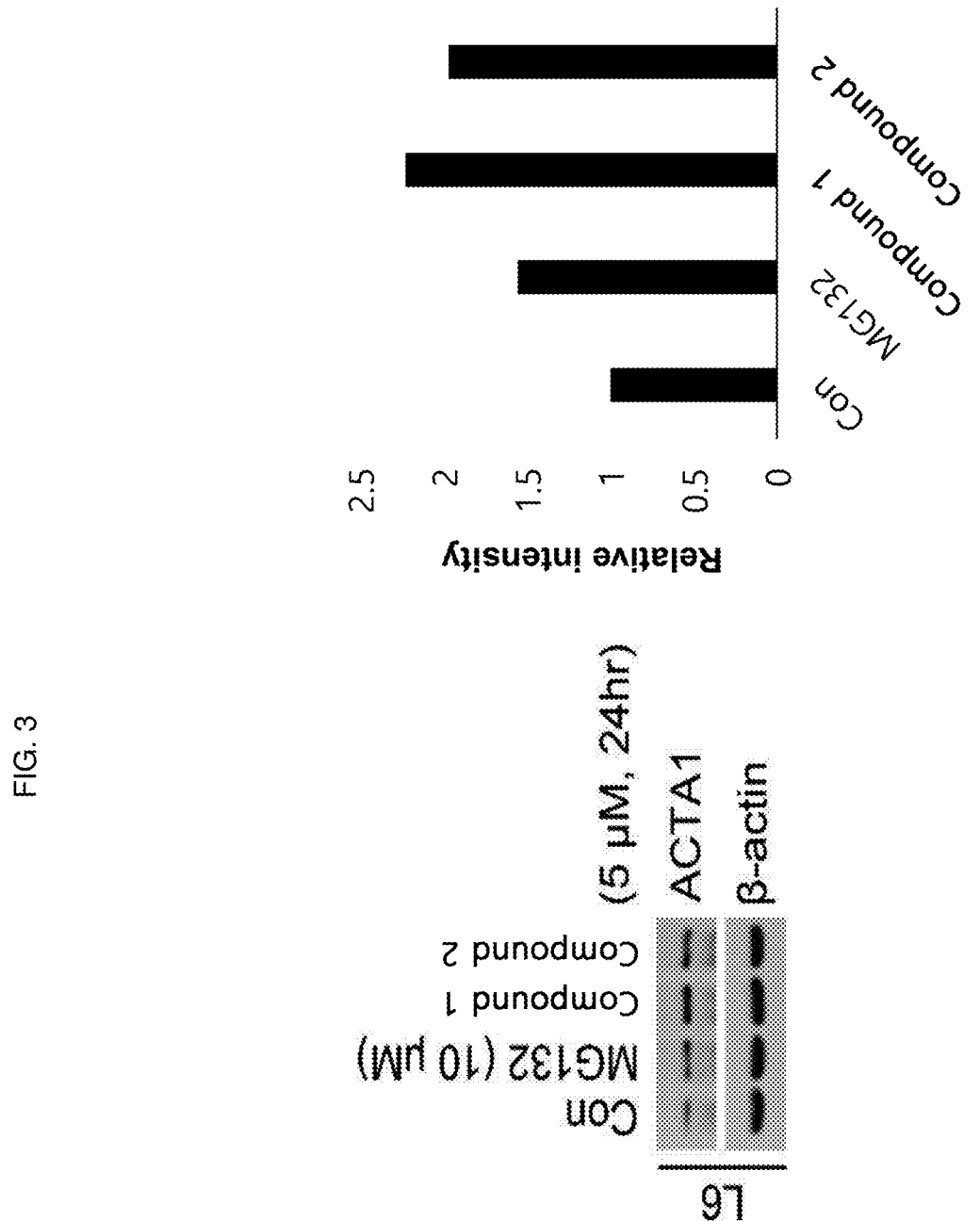
FIG. 3 illustrates the experimental results of confirming whether a compound (Compounds 1, 2) suppresses the degradation of actin in muscle cells using an immunoblotting method.
Figure 4:
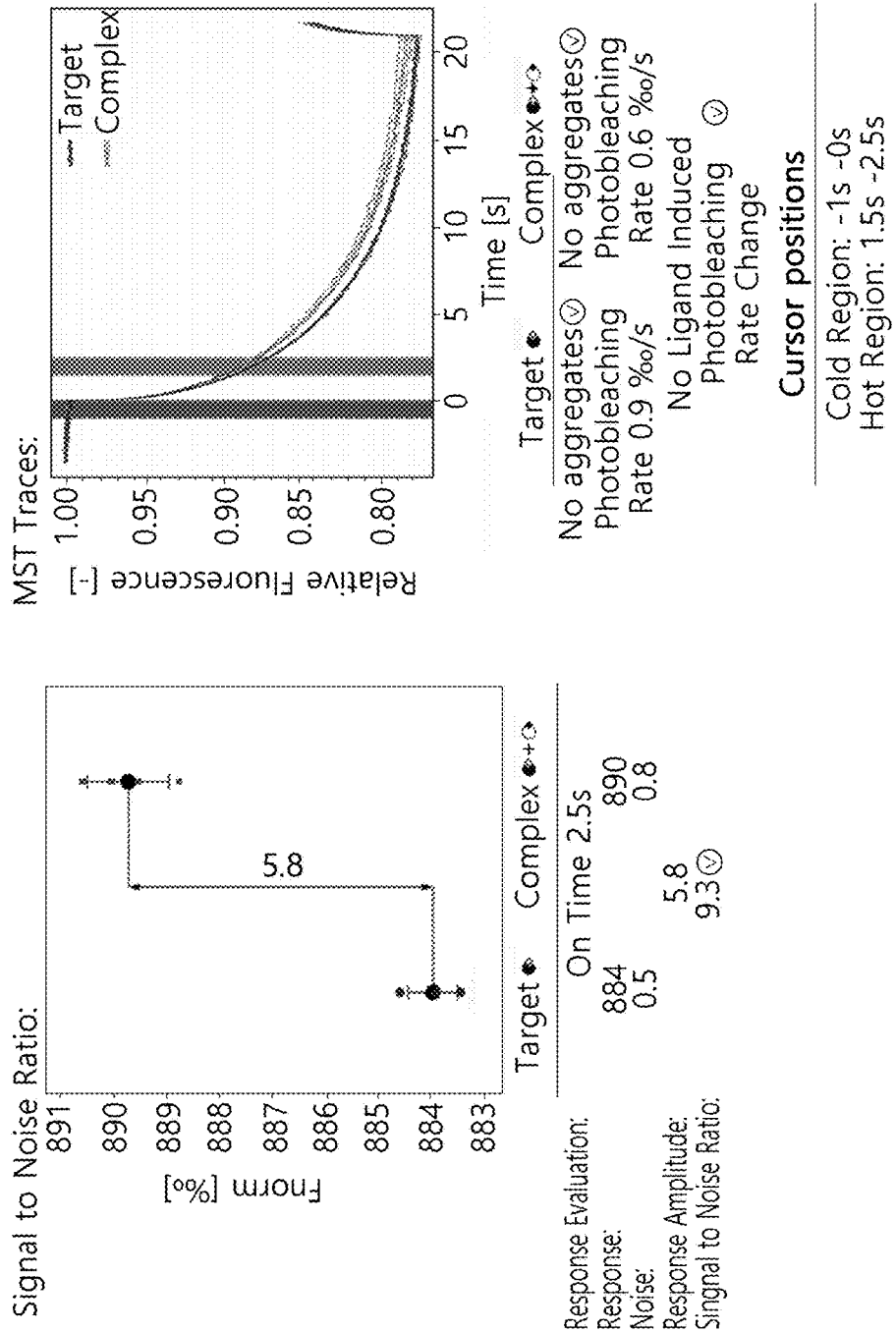
FIGS. 4 and 5 illustrate the result of binding of compound 1 and compound 2 by microscale thermophoresis MST.
Figure 5:
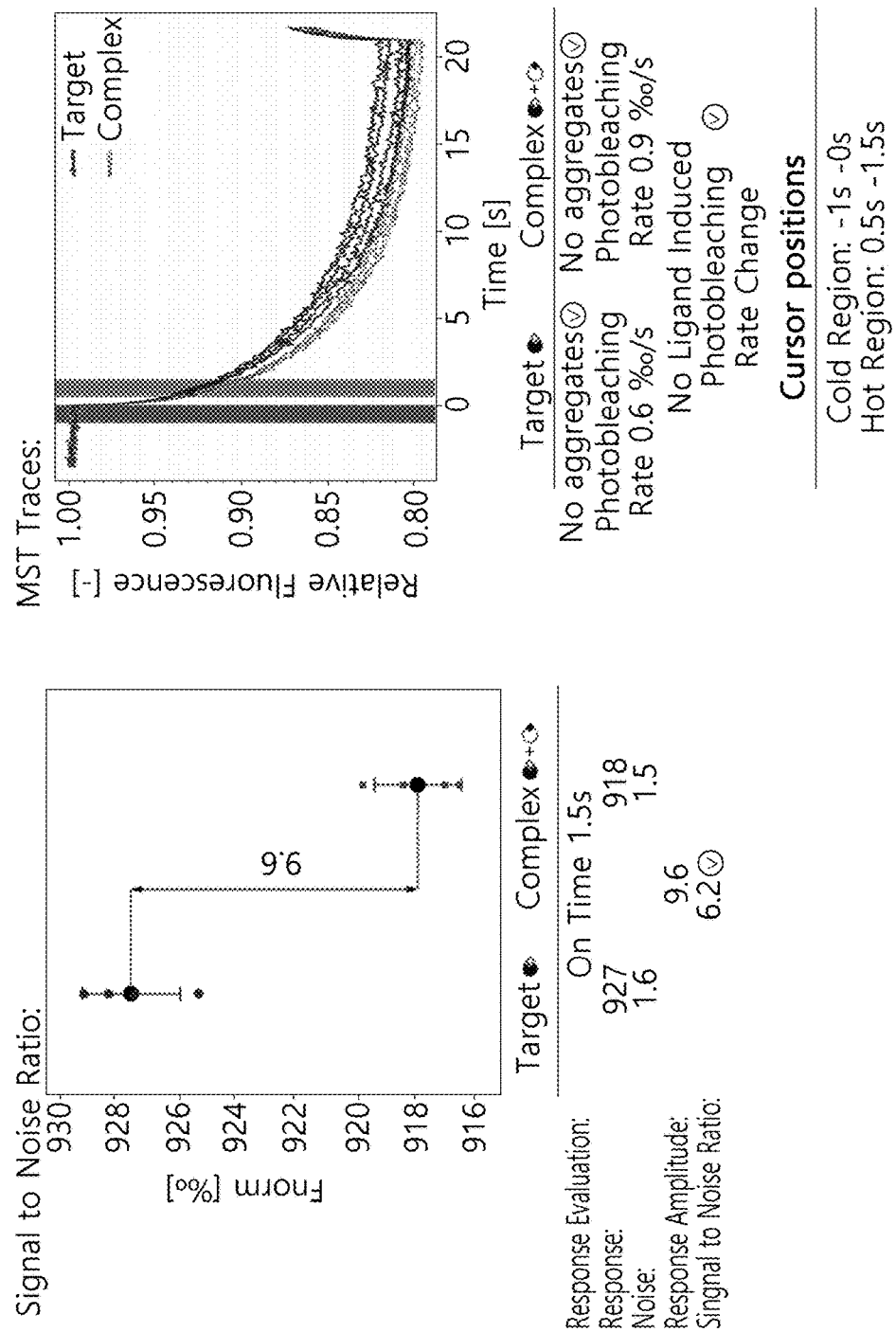

With reference to the examples, it can be confirmed that the compounds disclosed herein inhibit the degradation of the substrate by binding to UBR (see FIGS. 1, 2 and 3).

2. Treatment of UBR-Related Disease

The compound of the present specification or a salt thereof has a property of binding to a UBR box domain. That is, the compound of the present specification is a compound that functions as a ligand binding to the UBR box domain. Therefore, these compounds can be used to inhibit the degradation of proteins that are degraded by binding to the UBR box domain in the body, and such a mechanism may be used to treat a UBR-related disease.

1) Pharmaceutical Composition

The compound disclosed herein may be used in the preparation of a pharmaceutical composition for treating a subject in need thereof.

In this case, the treatment includes having an effect of ameliorating the symptoms of a particular medical condition or delaying the progression of the disease. In this case, the subject includes a human and a non-human animal. In this case, the pharmaceutical composition may include a carrier, an excipient and/or an additive, which are pharmaceutically acceptable, together with the aforementioned compound. The carrier, the excipient and the additive, which are pharmaceutically acceptable, include water, saline, glycol, glycerol, animal and vegetable fats, oils, starches, and the like, but are not limited thereto, and include all acceptable carriers, excipients and/or additives known in the art, which are pharmaceutically acceptable.

2) Treatment Method

The present specification provides a treatment method, including administering the compound disclosed herein or a pharmaceutically acceptable salt thereof to a subject in need thereof. In this case, administration of the compound or a pharmaceutically acceptable salt thereof may have an effect of alleviating the symptoms of a specific medical condition or delaying the progression of the disease compared to a subject who is not administered the compound or salt thereof. In this case, the subject includes a human and a non-human animal.

—UBR-Related Disease

As an example, the present specification provides a treatment method including administering the compound or a pharmaceutically acceptable salt thereof to a subject having a UBR-related disease. That is, the compound disclosed herein or a pharmaceutically acceptable salt thereof may be used to treat a UBR-related disease. As a specific example, the compound or a pharmaceutically acceptable salt thereof may be used to treat a specific disease to be treated by inhibiting the degradation of proteins that are degraded by binding to the UBR box domain.

The specific disease includes muscle loss caused by muscular dystrophy (Becker, Congenital, Duchenne, Distal, Emery-Dreifuss, Facioscapulohumeral, Limb-girdle, myotonic, oculopharyngeal), muscle wasting diseases mediated by muscle loss or degradation including sarcopenia or cancer cachexia, diseases caused by excessive protein degradation including liposarcoma, cystic fibrosis, Johanson-Blizzard syndrome, obstructive urinary tract disease (urethral obstruction sequence), autoimmune pancreatitis or known diseases related to the UBR box and UBR protein including Usher syndrome. As an example, the compound or a pharmaceutically acceptable salt thereof may be used to treat muscle loss mediated by UBR. For example, rapid loss of muscle mass accompanied by disease conditions such as cancer, sepsis, and hyperthyroidism is associated with an increase in degradation of intramuscular proteins, which is known to be associated with activation of a ubiquitin proteasome system. In this case, it is known that ubiquitin binding is increased particularly by activation of the N-end rule pathway, resulting in the occurrence of muscle loss [ALFRED L. GOLDBERG et al. 1998, 1999]. Accordingly, the compound disclosed herein or a pharmaceutically acceptable salt thereof may be used to treat the disease by preventing activation of the muscle loss pathway by binding to the UBR box domain. However, the present invention is not limited thereto, and the specific disease includes all diseases known as a disease related to UBR in the art.

V. EXAMPLES

Example 1. Synthesis of Compounds

TABLE 1

List of Compounds

| Compound No. | Name of compounds |
|---|---|
| 1 | 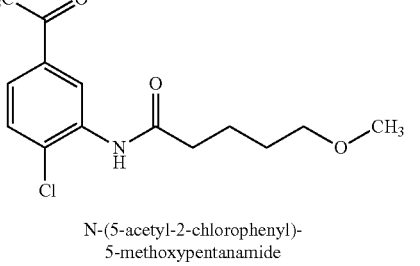<br>N-(5-acetyl-2-chlorophenyl)-5-methoxypentanamide |
| 2 | 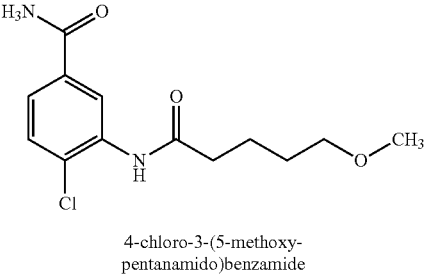 [SMILES: COCCCCC(=O)Nc1cc(C(N)=O)ccc1Cl]<br>4-chloro-3-(5-methoxypentanamido)benzamide |

$^1$H NMR spectra were recorded on Bruker Avance III 400 MHz and Bruker Fourier 300 MHz and TMS was used as an internal standard. LCMS was taken on a quadrupole Mass Spectrometer on Agilent 1260HPLC and 6120MSD (Column: C18 (50×4.6 mm, 5 μm) operating in ES (+) or (−) ionization mode; T=30° C.; flow rate=1.5 mL/min; detected wavelength: 220 nm, 254 nm Experimental Example 1-1. Preparation of Compound 1 (N-(5-acetyl-2-chlorophenyl)-5-methoxypentanamide)

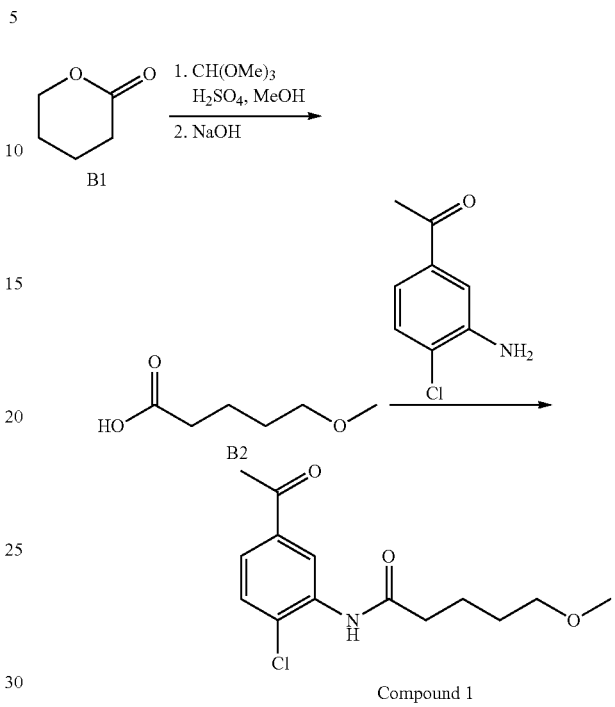

Compound 1

Step 1) Synthesis of B2

To a mixture of B1 (tetrahydro-2H-pyran-2-one, 5.00 g, 50 mmol, 1.0 eq) and trimethyl orthoformate (10.6 g, 100 mmol, 2.0 eq) in MeOH (100 mL) was added conc. H2SO4 (3 mL) dropwise at 25° C. The mixture was stirred at 65° C. for 16 hrs. The solvent was concentrated under reduced pressure. 8 M aqueous sodium hydroxide solution (10 mL) was added and the mixture was stirred at 80° C. for 2 hrs. After cooling to 10° C., the reaction mixture was acidified with 4N HCl and extracted with EA (50 mL×3). The combined organic layers were washed with brine, dried over Na2SO4 and concentrated to give B2 (5-methoxypentanoic acid, 4.0 g, yield 60%) as colorless oil.

1 HNMR (CDCl3, 400 MHz): δ 3.41 (t, J=6.0 Hz, 2H), 3.34 (s, 3H), 2.39 (t, J=7.6 Hz, 2H), 1.62-1.74 (m, 4H).

Step 2) Synthesis of Compound 1

A mixture of B2 (5-methoxypentanoic acid, 0.2 g, 1.52 mmol, 1.0 eq.) and HATU (0.69 g, 1.82 mmol, 1.2 eq.) in DMF (5 mL) was stirred at 25° C. for 30 min. Then 1-(3-amino-4-chlorophenyl)ethan-1-one (0.26 g, 1.52 mmol, 1.0 eq) and triethylamine (0.31 g, 0.30 mmol, 2.0 eq) were added. The mixture was stirred at 50° C. for 48 hrs. The mixture was poured into water (50 mL) and extracted with EA (50 mL×3). The combined organic layers were washed with brine, dried over Na2SO4 and concentrated to give crude product, which was purified by prep-HPLC. The collected fraction was concentrated to remove most of CH3CN. The residual fraction was freeze-dried to give compound 1 (N-(5-acetyl-2-chlorophenyl)-5-methoxypentanamide, 38 mg, yield 8.8%) as a white solid.

1 HNMR (CDCl3, 400 MHz): δ 9.03 (s, 1H), 7.84 (s, 1H), 7.67 (dd, J=8.4 Hz, 2 Hz, 1H), 7.46 (d, J=8.4 Hz, 1H), 3.45 (t, J=6.4 Hz, 2H), 3.35 (s, 3H), 2.61 (s, 3H), 2.52 (t, J=7.2 Hz, 2H), 1.85-1.88 (m, 2H), 1.69-1.73 (m, 2H).

LCMS; Mass Calcd.: 283.7; MS Found: 283.9.

Experimental Example 1-2. Preparation of Compound 2 (4-chloro-3-(5-methoxypentanamido)benzamine)

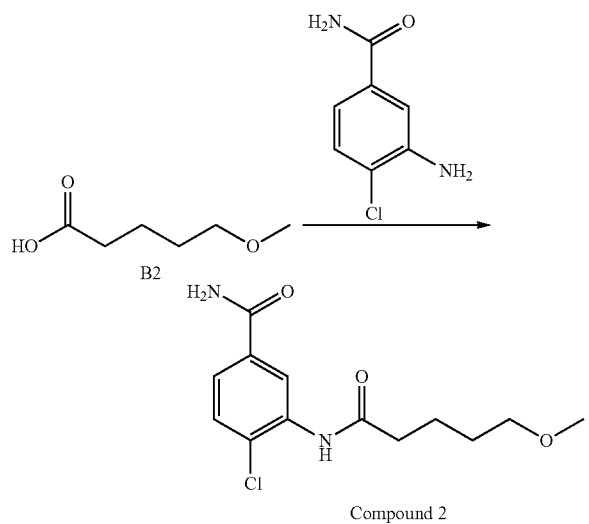

Compound 2

A mixture of B2 (5-methoxypentanoic acid, 0.2 g, 1.52 mmol, 1.0 eq) and HATU (0.69 g, 1.82 mmol, 1.2 eq) in DMF (5 mL) was stirred at 25° C. for 30 min. Then 3-amino-4-chlorobenzamide (0.26 g, 1.52 mmol, 1.0 eq) and triethylamine (0.31 g, 0.30 mmol, 2.0 eq) were added. The mixture was stirred at 50° C. for 48 hrs. The mixture was poured into water (50 mL) and extracted with EA (50 mL×3). The combined organic layers were washed with brine, dried over Na2SO4 and concentrated to give crude product, which was purified by prep-HPLC. The collected fraction was concentrated to remove most of CH3CN. The residual fraction was freeze-dried to give compound 2 (4-chloro-3-(5-methoxypentanamido)benzamide, 48 mg, yield 11.1%) as a yellow solid.

1HNMR (CDCl3, 400 MHz): δ 8.82 (s, 1H), 7.89 (s, 1H), 7.64 (dd, J=8.4 Hz, 2 Hz, 1H), 7.46 (d, J=8.4 Hz, 1H), 5.93-6.38 (m, 2H), 3.45 (t, J=6.0 Hz, 2H), 3.36 (s, 3H), 3.52 (t, J=7.2 Hz, 2H), 1.81-1.88 (m, 2H), 1.66-1.73 (m, 2H).

LCMS; Mass Calcd.: 284.7; MS Found: 284.9.

Example 2. Binding Assay Experiment

Example 2-1 Confirmation of Whether Muscle Actin is Arg/N-Degron Pathway Substrate Using Immunoblotting Method A L6 cell line, which is a rat muscle-derived cell, was cultured using a DMEM medium containing 10% FBS and 1% streptomycin/penicillin in an incubator in which 5% carbon dioxide was maintained, and cells were aliquoted into a 12-well plate after the culture. The cells were additionally cultured for 24 hours so as to be completely attached to the surface of the plate. To confirm whether MG132 increased UBR1 binding, cells were collected after treatment with MG132 (10 uM) alone for 24 hours. To extract proteins from the collected cells, 50 uL of a lysis buffer (20 mM Tris, pH 7.4, 150 mM NaCl, 1% Triton-X-100, 2 mM NaF, 2 mM EDTA, 2 mM b-glycerophosphate, 5 mM sodium orthovanadate, 1 mM PMSF, leupeptin, aprotenin) was injected into each sample, and the cells were lysed. A sample buffer was added to each sample based on the measured total protein concentration, and the mixture was reacted at 100° C. for 5 minutes. After 5 uL was taken from the completely reacted sample and aliquoted into each well of an acrylamide gel, an immunoblotting method was performed, and the experimental results are illustrated in [FIG. 1].

For the immunoblotting method, a representative experiment was schematized from three or more independent experiments.

Referring to FIG. 1, it was confirmed that the levels of ACTA1, ACTC1, and ACTG2 were increased by MG132 compared to a control. Further, it was confirmed that the levels of ACTA1 and ACTG2 were increased when a UBR protein was knocked down. That is, it could be confirmed that muscle actin is an Arg/N-degron pathway substrate.

Example 2-2 Confirmation of Inhibition of R-nsP4 Degradation by In Vitro Transcription/Translation Method A TnT® Quick Coupled Transcription/Translation System kit was used to confirm the R-nsP4 expression of the compounds. After a pre-mix was made using Transcend Biotin-Lysyl-tRNA, methionine, bestatin, a TnTquick Master mix and a DHFR-Ub-R-nsP4 plasmid, the pre-mix was mixed with a compound (1 uM). After each sample was reacted at 30° C. for 40 minutes, a 5×SDS loading dye was added thereto. After the resulting mixture was reacted at 95° C. for 2 minutes, 5 uL was taken and aliquoted into each well of an acrylamide gel, and then an immunoblotting method was performed, and the experimental results are illustrated in [FIG. 2]. For an in vitro transcription/translation method, a representative experiment was schematized from three or more independent experiments.

Referring to FIG. 2, it can be confirmed that the level of R-nsP4 is increased by Compound 1, 2 compared to the control. That is, it could be confirmed that in the case of treatment with the compound according to the present invention, the R-nsP4 level was increased by binding to UBR1.

Example 2-3 Evaluation of Inhibition of Muscle Cell Actin Degradation by Immunoblotting To evaluate the actin degradation of compounds in muscle cells, a L6 cell line, which is a rat muscle-derived cell, was cultured using a DMEM medium containing 10% FBS and 1% streptomycin/penicillin in an incubator in which 5% carbon dioxide was maintained. In order to measure the UBR1 binding strength according to the treatment with a representative compound selected from the present compounds, cells were aliquoted into a 12-well plate. The cells were additionally cultured for 24 hours so as to be completely attached to the surface of the plate. Cells were collected after treatment with a compound (5 uM) alone for 24 hours to confirm whether the compound increased UBR1 binding. To extract proteins from the collected cells, 50 uL of a lysis buffer (20 mM Tris, pH 7.4, 150 mM NaCl, 1% Triton-X-100, 2 mM NaF, 2 mM EDTA, 2 mM b-glycerophosphate, 5 mM sodium orthovanadate, 1 mM PMSF, leupeptin, aprotenin) was injected into each sample, and the cells were lysed. A sample buffer was added to each sample based on the measured total protein concentration, and the mixture was reacted at 100° C. for 5 minutes. After 5 uL was taken from the completely reacted sample and aliquoted into each well of an acrylamide gel, an immunoblotting method was performed, and the experimental results were illustrated in [FIG. 3]. For the immunoblotting method, a representative experiment was schematized from three or more independent experiments.

Referring to FIG. 3, it can be confirmed that the level of ACTA1 is further increased by Compound 1, Compound 2. That is, it could be confirmed that in the case of treatment with the compound according to the present invention, the degradation of an intramuscular protein ACTA1 was inhibited by binding to UBR1.

Example 2-4 Measurement of Presence or Absence of Binding Between UBR1 and Compound Using MST 1) Preparation of UBR1 Protein A Gln97-Pro168 portion corresponding to the UBR box of Human UBR1 (UniProt ID: Q8IWV7) was cloned into a modified expression vector, and then expressed in E. coli. After affinity chromatography was used, a tag was removed by a protease, and then Gly-His-Met was added to the N-terminal. After ion chromatography was performed, a final UBR box protein of a UBR1 was purified using gel filtration chromatography in a buffer composition of 10 mM NaCl, 20 mM Tris-HCl, 2 mM beta-mercaptoethanol, and pH 7.5.

2) UBR1 UBR Box Protein Labeling

A dye of the Monolith protein labeling kit RED-NHS 2nd generation (Cat #MO-L011) has an NHS-ester group that forms a covalent bond with primary amines (lysine residues). This dye is optimized for a Monolith-series device equipped with a RED detector. A purified UBR1 UBR box protein was labeled according to the presented protocol using this kit.

3) Measurement of Presence or Absence of Binding Between UBR1 and Ligand Using MST Thermophoresis refers to a phenomenon in which particles move due to a temperature gradient. Particles present in a high temperature region have greater kinetic energy than particles present in a low temperature region, and more frequently collide with surrounding particles with greater energy. As a result, particles move from the high temperature region to the low temperature region.

Thermophoresis of proteins is typically different from that of protein-ligand complexes. This is because the binding of the ligand changes its size, electric charge, and solvation energy. Furthermore, MST may detect changes in the solvent entropy of protein molecules caused by ligand binding even though the ligand binding does not significantly change the size and electric charge of the protein. Therefore, the binding of the UBR1 UBR box protein and the ligand compound was measured using MST, and it was confirmed that the presented ligand binds to the UBR1 UBR box.

What is claimed is:

1. A compound or a salt thereof, having the structure of formula 1:

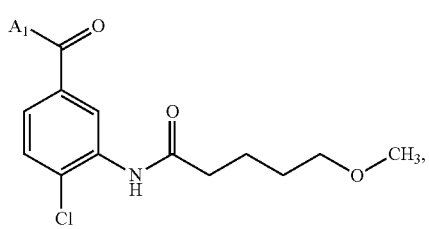

[formula 1]

wherein the $A_1$ is $NH_2$.

2. A pharmaceutical composition comprising the compound of claim 1 or pharmaceutically acceptable salt thereof and an excipient.

3. A method for treating UBR related disease in a subject, the method comprising:

administering to the subject a composition comprising a therapeutically effective amount of a compound of formula 1 or a salt thereof:

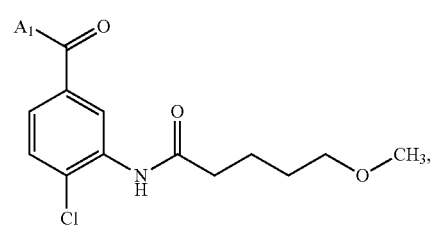

[formula 1]

wherein the $A_1$ is $CH_3$ or $NH_2$.

4. The method of claim 3, wherein the UBR related disease is selected from muscle loss caused by muscular dystrophy, muscle wasting diseases mediated by muscle loss or degradation, diseases caused by excessive protein degradation, Johanson-Blizzard syndrome, obstructive urinary tract disease, autoimmune pancreatitis or Usher syndrome.

5. The method of claim 4, wherein the muscle loss caused by muscular dystrophy is Becker, Congenital, Duchenne, Distal, Emery-Dreifuss, Facioscapulohumeral, Limb-girdle, myotonic, or oculopharyngeal.

6. The method of claim 4, wherein the muscle wasting diseases mediated by muscle loss or degradation is sarcopenia or cancer cachexia.

7. The method of claim 4, wherein the muscle wasting diseases caused by excessive protein degradation is liposarcoma, or cystic fibrosis.

8. The method of claim 4, wherein the obstructive urinary tract disease is urethral obstruction sequence.

9. A method for binding a compound or a salt thereof to a UBR box domain in a subject, the method comprising:

administering to the subject a composition comprising a compound of formula 1 or a salt thereof:

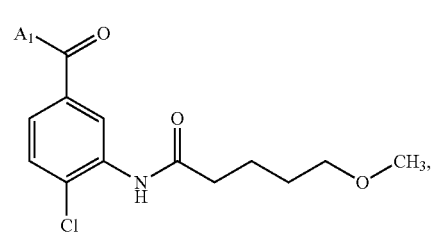

[formula 1]

wherein the $A_1$ is $CH_3$ or $NH_2$.

* * * * *